C. I. MATSON.
SAFETY RAZOR.
APPLICATION FILED MAY 20, 1916.
1,210,340. Patented Dec. 26, 1916.
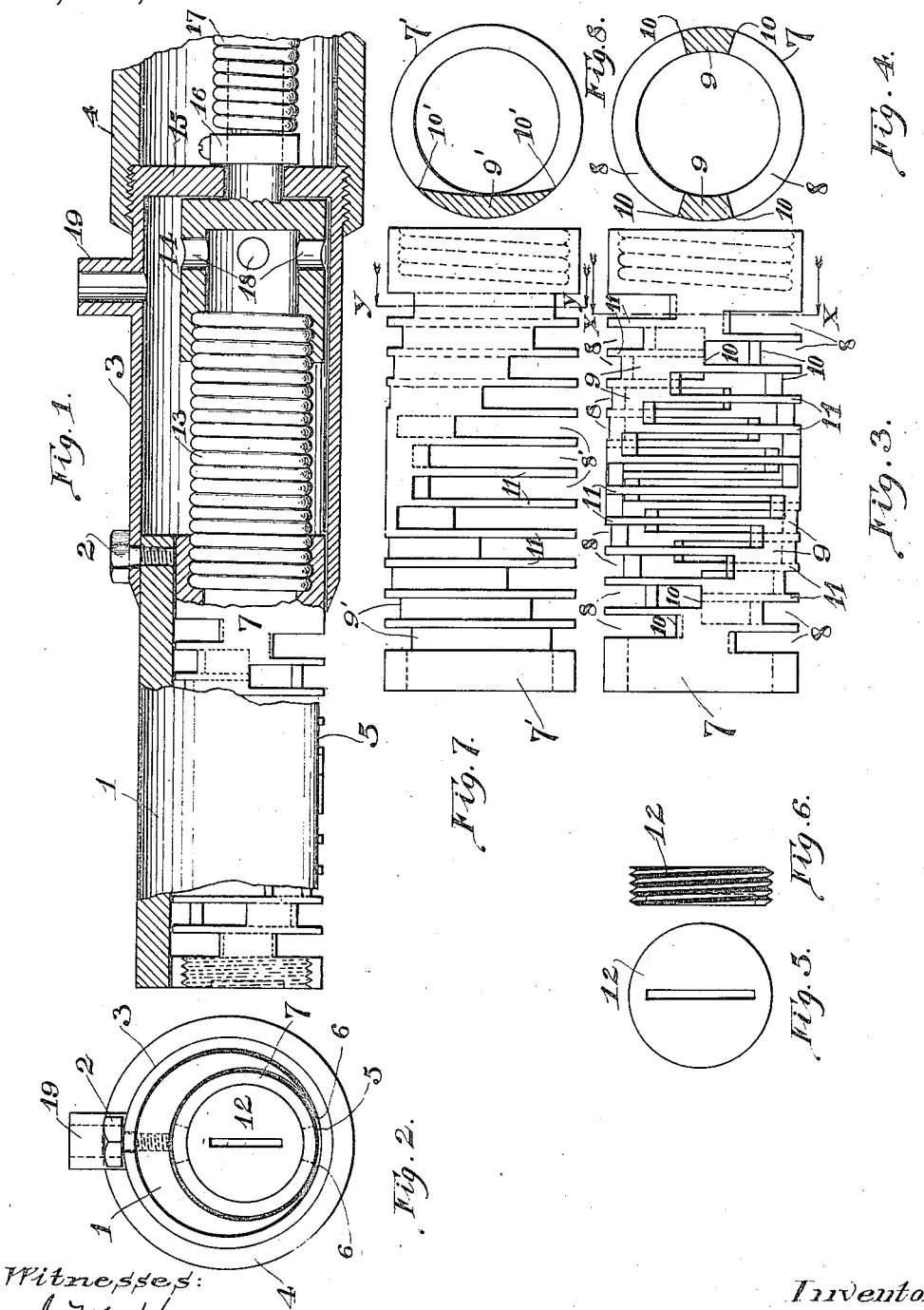
Witnesses:
J. M. Haines.
A. A. Olson
Inventor:
Charles I. Matson,
by Joshua R. H. Potts
His Attorney.

UNITED STATES PATENT OFFICE.

CHARLES I. MATSON, OF CHICAGO, ILLINOIS.

SAFETY-RAZOR.

1,210,340.      Specification of Letters Patent.      Patented Dec. 26, 1916.

Application filed May 20, 1916. Serial No. 98,933.

*To all whom it may concern:*

Be it known that I, CHARLES I. MATSON, a citizen of the United States, and a resident of the city of Chicago, county of Cook, and State of Illinois, have invented certain new and useful Improvements in Safety-Razors, of which the following is a specification.

My invention relates to improvements in safety razors or clipping devices, and has for its object the production of a device of this character which is of simple construction, one which may be readily and easily operated, one which will be absolutely safe in use, and one which will be highly efficient.

Other objects will appear hereinafter.

With these objects in view, the invention consists in the combinations and arrangements of parts hereinafter described and claimed.

The invention will be best understood by reference to the accompanying drawings forming a part of this specification, and in which, Figure 1 is a longitudinal sectional view of a safety razor embodying the invention, Fig. 2 is an end view thereof, Fig. 3 is a slightly enlarged side elevation of the rotary element of the device detached, Fig. 4 is a section taken on line *x—x* of Fig. 3, Figs. 5 and 6 are a front elevation and a side elevation respectively, of a closure plug provided at the outer end of the rotary cutting element, and Figs. 7 and 8 are views similar to Figs. 3 and 4 respectively, showing a slightly modified form of rotary cutting element which may be employed.

The preferred form of construction, as illustrated in the drawings, comprises a tubular housing 1, the rearward end of which is secured by a set screw 2 in a tubular housing member 3, the latter, in turn, being secured, as by threading, to the forward end of a housing member 4. The housing 1 is formed, at one side, with a longitudinally extending opening 5, the opposite sides of said opening being sharpened to constitute cutting edges 6.

Rotatably mounted in the housing 1 is a cutting element 7. Said cutting element is of tubular cylindrical form, the same being formed with spaced transversely extending slots 8 which result in the formation of diametric connecting portions 9, the terminal edges 10 of the portions 9 constituting cutting edges which are flush with the periphery of the member 7, as clearly shown in Fig. 4. The narrow ribs or flanges 11 which intervene the slots 8 constitute circular guards adapted, when the device is in use, to prevent cutting of the skin, as might otherwise result. The cutting edges 10 at opposite sides of the cutting element are in staggered relation so that each cutting edge overlaps circumferentially with one of the guard portions 11. This being so, in the use of the device, the entire surface engaged by the device, will be traversed by the cutting edges 10, no part being left untouched, as would otherwise result were the cutting edges at opposite sides of the device in circumferential alinement, since in this case, the portions of the skin contacting with the guards 11 would not be traversed by the cutting edges. Also, the cutting edges 10 are circumferentially spaced or stepped around the cutting element so that the various cutting edges will be successively brought into operative position and thus the pull upon the skin and pressure upon the driving element connected with the member 7, relieved and distributed.

If desired, the cutting element may be in the form shown in Figs. 7 and 8, in which case said element 7' is formed with transversely-extending slots 8', each slot resulting in the formation of but a single cutting edge-forming portion 9', with the cutting edges 10' provided at the ends thereof, as shown in Fig. 8. The outer end of the cutting element is closed by a threaded plug 12, the inner end of said cutting element being open. Said inner end is connected by a flexible shaft 13 in the form of a comparatively heavy helical spring, with one end of a driving element 14 which is rotatably mounted in the bearing 15 of housing section 3, said member 14 being locked against longitudinal movement in the member 15 by means of a collar 16. The rearward end of member 14 is adapted for connection, through the medium of a flexible shaft 17, with a motor or other desired driving means employed in connection with the device. The longitudinal passage which is formed in the cutting element 7 communicates, as seen, with the passage through the flexible shaft 13, the latter passage terminating in the cup-formed forward end of member 14. The latter is provided with openings 18 which are in open communication, as seen, with an outlet nipple 19 on the housing member 3 which is adapted for connection with a suction tube used in connection with the device. With this arrangement, the hair which is removed by the device, during the operation of the latter, will be drawn into the interior of the cutting element 7 whence the same will be drawn through the flexible shaft 13 into member 14, and thence through openings 18 out through the discharge or outlet nipple 19.

In the operation of the device, it is of course apparent, that the cutting edges 10 coöperate with the cutting edges 6 of the housing 1, the result being a sort of clipping action. The cutting element may be rotated in either direction, the cutting edges 10 facing circumferentially in one direction coöperating with one of the cutting edges 6, during rotation of the cutting element in one direction, and the other cutting edges 10 coöperating with the other cutting edge 6, in the reverse rotation of the cutting element.

While I have illustrated and described the preferred forms of construction for carrying my invention into effect, these are capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A rotary cutting element comprising a plurality of longitudinally spaced cutting edges; and guards interposed between said cutting edges, substantially as described.

2. A rotary cutting element comprising a plurality of longitudinally spaced cutting edges; and circular guards interposed between said cutting edges, substantially as described.

3. A rotary cutting element comprising a plurality of longitudinally spaced cutting edges; and circular guards interposed between said cutting edges and having their peripheries substantially flush with said cutting edges, substantially as described.

4. A rotary cutting element comprising a plurality of longitudinally extending cutting edges; and circular guards interposed between said cutting edges, said cutting edges being longitudinally and circumferentially spaced, and each of said cutting edges being positioned to overlap circumferentially with one of said guards, substantially as described.

5. A rotary cutting element comprising a plurality of longitudinally extending cutting edges; and circular guards interposed between said cutting edges, said cutting edges being longitudinally and circumferentially spaced and staggered, relatively to said guards, whereby each of said cutting edges overlaps circumferentially with one of said guards, substantially as described.

6. A rotary cutting element comprising a plurality of longitudinally spaced cutting edges; and guards interposed between said cutting edges, there being a passage leading from said cutting edges through the interior of said element, substantially as described.

7. A rotary cutting element comprising a cylindrical body, said body being transversely slotted to form longitudinally extending cutting edges at the periphery thereof; and intermediate circumferentially extending guard-forming portions, substantially as described.

8. A rotary cutting element comprising a cylindrical tubular body, said body being transversely slotted to form longitudinally extending cutting edges at the periphery thereof; and intermediate circumferentially extending guard-forming portions, substantially as described.

9. A rotary cutting element comprising a cylindrical body, said body being transversely slotted to form diametric cutting edge-forming portions at the periphery thereof; and intermediate circumferentially extending guard-forming portions, substantially as described.

10. A rotary cutting element comprising a cylindrical tubular body, said body being transversely slotted to form longitudinally extending cutting edges at the periphery thereof; intermediate circumferentially extending guard-forming portions; and a closure for one end of said cutting element, the opposite end of said cutting element being open, substantially as described.

11. A device of the class described comprising a rotary cutting element, said element comprising a plurality of longitudinally spaced cutting edges; guards interposed between said cutting edges; a housing embracing said cutting element; and cutting edges on said housing for coöperation with the cutting edges of said cutting element, substantially as described.

12. A device of the class described comprising a rotary cutting element, said element comprising a plurality of longitudinally spaced cutting edges; guards interposed between said cutting edges; a housing embracing said cutting element, there being an opening at one side of said housing for exposure of said cutting element; and cutting edges constituted at opposite sides of said opening for coöperation with the cutting edges of said cutting element, substantially as described.

13. A device of the class described comprising a housing having an opening at one side; a rotary cutting element mounted in said housing; a plurality of longitudinally spaced cutting edges provided in said cutting element; guards interposed between said cutting edges; cutting edges on said housing at opposite sides of the opening therein; and a shaft rotatably mounted in said housing and having one end connected with said cutting element for rotating the same, substantially as described.

14. A device of the class described comprising a housing having an opening at one side; a rotary cutting element mounted in said housing; a plurality of longitudinally spaced cutting edges provided in said cutting element; guards interposed between said cutting edges; cutting edges on said housing at opposite sides of the opening therein; a shaft rotatably mounted in said housing and having one end connected with said cutting element for rotating the same, there being a passage formed in said cutting element and shaft leading from said cutting edges; and an outlet in said housing communicating with said passage, substantially as described.

15. A device of the class described comprising a housing having an opening at one side; a rotary cutting element mounted in said housing; a plurality of longitudinally spaced cutting edges provided in said cutting element; guards interposed between said cutting edges; cutting edges on said housing at opposite sides of the opening therein; a rotary driving element mounted in said housing; and a flexible shaft operatively connecting said driving element and said cutting element, substantially as described.

In testimony whereof I have signed my name to this specification in the presence of two subscribing witnesses.

CHARLES I. MATSON.

Witnesses:
   JOSHUA R. H. POTTS,
   HELEN F. LILLIS.